United States Patent [19]

Iannucci et al.

[11] Patent Number: 4,466,077
[45] Date of Patent: Aug. 14, 1984

[54] METHOD AND APPARATUS FOR DIVISION EMPLOYING ASSOCIATIVE MEMORY

[75] Inventors: Robert A. Iannucci, Quincy, Mass.; James R. Kleinsteiber, Glen Aubrey, N.Y.

[73] Assignee: International Business Machines Corporation, Armonk, N.Y.

[21] Appl. No.: 305,765

[22] Filed: Sep. 25, 1981

[51] Int. Cl.³ .................. G06F 7/52; G06F 7/544
[52] U.S. Cl. .................................. 364/767; 364/766; 364/763
[58] Field of Search .................. 364/767, 766, 763

[56] References Cited

U.S. PATENT DOCUMENTS 3,293,418 12/1966 Thornton .............................. 364/767
3,684,879  8/1972 Koehler ................................ 364/767
3,852,581 12/1974 Reynard et al. ..................... 364/767

*Primary Examiner*—Gareth D. Shaw
*Assistant Examiner*—Karl Huang
*Attorney, Agent, or Firm*—J. Jancin, Jr.; P. M. Brannen; D. D. Bahler

[57] ABSTRACT

A method and apparatus for the arithmetic division operation is disclosed in which a set of multiples of the divisor are stored in an associative memory in addresses which match the respective multiples. The most significant byte of the numerator is then compared to the contents of each associative entry. A flag is generated signifying that the corresponding entry is less than or equal to the most significant byte of the numerator. After the flags have been generated, the address of the last flag which is on, is selected. This provides a trial "digit out", which is used to address the true table of multiples and select a value which is subtracted from the left-digit-shifted numerator (or intermediate result). If no underflow condition results, the trial "digit out" is valid and should be stored and the next iteration started. For an underflow condition, the "digit out" is decremented and stored, the X1 multiple is added to the numerator and the next iteration is carried out. If the flag indicating X8 is on or at a value of 1, an X8 latch is set and a second pass is carried out, with the X8 latch output becoming part of the "digit out".

9 Claims, 3 Drawing Figures

MSB(DEN. X1) ≤ MSB NUM. = FLAG 1
MSB(DEN. X2) ≤ MSB NUM. = FLAG 2
MSB(DEN. X3) ≤ MSB NUM. = FLAG 3
MSB(DEN. X4) ≤ MSB NUM. = FLAG 4
MSB(DEN. X5) ≤ MSB NUM. = FLAG 5
MSB(DEN. X6) ≤ MSB NUM. = FLAG 6
MSB(DEN. X7) ≤ MSB NUM = FLAG 7
MSB(DEN. X8) ≤ MSB NUM. = FLAG 8

FIG. 1

|  | NO-UNDERFLOW | UNDERFLOW |
|---|---|---|
| X8 FLAG = 0 | STORE DIGIT OUT. PROCEED TO NEXT ITERATION | DECREMENT DIGIT OUT AND STORE. ADD X1 MULTIPLE TO NUMERATOR AND PROCEED TO NEXT ITERATION. |
| X8 FLAG = 1 | SET X8 LATCH. FORCE SECOND PASS. X8 LATCH BECOMES PART OF DIGIT OUT. PROCEED TO NEXT ITERATION. | DECREMENT DIGIT OUT AND STORE. ADD X1 MULTIPLE TO NUMERATOR AND PROCEED TO NEXT ITERATION. |

FIG. 2

METHOD AND APPARATUS FOR DIVISION EMPLOYING ASSOCIATIVE MEMORY

BACKGROUND OF THE INVENTION

1. Field of the Invention

This invention relates to arithmetic functions carried out by digital processors, and particularly to an improved method of and means for carrying out the arithmetic division function. More particularly, the invention relates to a method of and means for providing arithmetic division using an associative memory to provide multi-bit operations, particularly one hexadecimal digit (four bits) at a time; or one decimal digit in EBCD form.

2. Description of the Prior Art

Multi-bit dividing arrangements are known in the prior art, as shown, for example, in U.S. Pat. Ser. No. 3,684,879. However, it is not apparent that arrangements for dividing hexadecimal digits by halves either could or should be provided. Moreover, none of the prior art discloses the use of an associative memory in an arithmetic division system, nor do they extend the concept to decimal digits. Also, no art discloses using a reduced table of multiples in hexidigital or decimal division.

SUMMARY OF THE INVENTION

The present invention provides a method of and means for carrying out the arithmetic function in which division of two arbitrarily long operations is carried out one hexadecimal digit (four bits) or an EBCD decimal digit at one time. The basic difficulty in performing a "digit" divide is that it is exactly the problem to find the correct digit by which to multiply the denominator so that the digit multiplied by the denominator is less than or equal to the numerator or intermediate result.

To provide the desired results, an improved method comprises the following steps: Generate a table of multiples of the denominator, using integer values of multiples, i.e., X1, X2, . . . Store these tabular values in a storage or memory such as a conventional read/write array. Store the most significant byte of this table in an associative array or content addressable memory. The next step involves comparing the most significant byte of the numerator (or intermediate result) with the contents of each associative memory entry. A flag will be generated for each comparison signifying that the corresponding entry is less than or equal to the most significant byte of the numerator. A "digit out" value is then selected on the basis of the highest value multiple indicated by the last flag set on. The next step involves the subtraction of the multiple thus selected from the numerator or intermediate result. The next step is to determine whether or not an underflow exists. If none, the next step is to store the digit out and proceed to the next iteration. If an underflow exists, the digit out is decremented by 1 and stored, and the X1 multiple is added to the numerator or intermediate result before proceeding to the next iteration.

For division by digits 9 through F (hexadecimal), or 6 through 9 (decimal), two different approaches are possible. First, the table of multiples can be expanded to include X9 through XF, (or X6 through X9 for decimal), with an accompanying expansion of the associative memory. This is expensive in terms of hardware and time, since the extra multiples must be generated and loaded. The second, and better approach is to provide only the table and array space for entries X1 through X8, (X1 through X5 for decimal), and to provide controls such that the circuitry, upon encountering the situation where the numerator or intermediate result digit is greater than the X8 entry, (X5 for decimal), will force two passes to be made on the same numerator or intermediate result. For example, for hexadecimal, if the first pass results in a digit 8, and the second pass results in a digit 3, the resulting digit out is equal to 8 plus 3 or 11 (B in hexadecimal notation).

The apparatus for providing this novel division comprises a read/write array for containing the table of multiples, which is connected to one input of an arithmetic/logical unit (ALU). Another input of the ALU, via a left-shifter, is from a register holding the numerator or intermediate result. The output of the ALU is supplied to an associative memory, as well as the value of the most significant bytes, to select the output of the associative memory. The address of the related flag is supplied from the associative memory to the read/write array to select the appropriate multiple. The X8 flag is connected to the output, as appropriate, as well as the flag value, to indicate the digit out.

DESCRIPTION OF THE DRAWINGS

FIG. 1 is a tabulation of the entries in an associative array employed in a preferred embodiment of the invention;

FIG. 2 is a diagrammatic illustration of a decision matrix for the invention.

DESCRIPTION OF THE PREFERRED EMBODIMENTS

Figure 3:
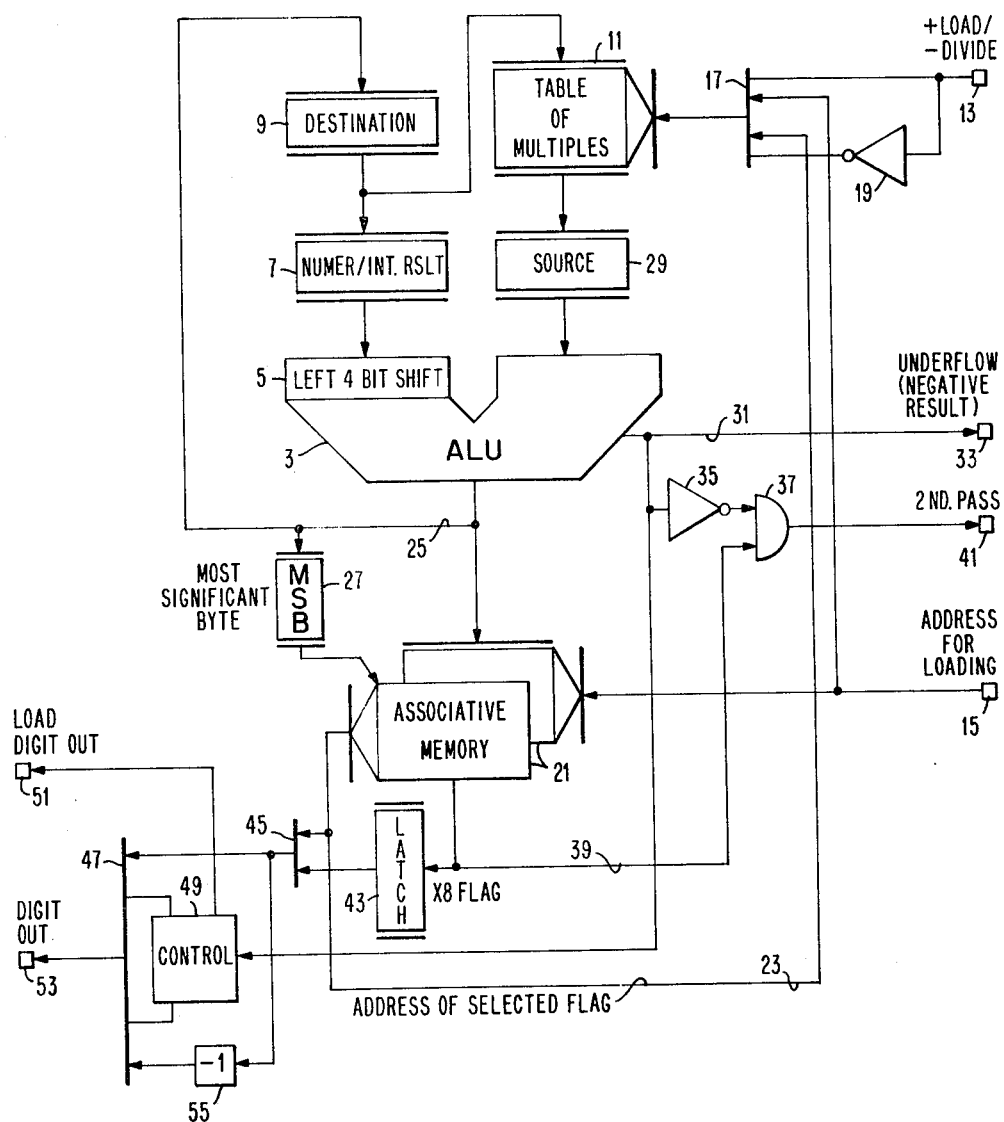
FIG. 3 is a schematic block diagram of the circuitry involved in a preferred embodiment of apparatus for carrying out the invention.

The method of carrying out the division of two hexadecimal numbers or two decimal numbers in accordance with the invention involves the following steps:

(1) Create a table of multiples of the denominator and store this table in a read/write storage. Such a table storage is shown in FIG. 3.

(2) Store the most significant byte of each table entry in a content-addressable or associative memory.

(3) Compare the most significant byte of the numerator (or intermediate result) with the contents of each entry in the associative memory.

(4) Generate a flag for an entry which is less than or equal to the most significant byte of the numerator or intermediate result. See FIG. 1.

(5) Select the address of the last flag which is on, this provides the value of the digit out.

(6) Use this digit to address the table of multiples and read out the selected value.

(7) Subtract this value from the numerator or intermediate result.

(8) If there is no underflow and the digit selected is X8, (X5 for decimal), then a second pass is forced. That is, processing goes back to step (3) to continue with the same digit, only 8 will be added to the digit value before it is stored as the low-order digit of the quotient, (5 will be added for decimal).

(9) If there is no underflow and the digit selected is not X8, (X5 for decimal), the digit is valid and is stored as the low-order digit of the quotient.

(10) If there is an underflow, decrement the digit by 1 and store its decremented value. FIG. 2 shows the possible conditions for underflow or no underflow. Add the X1 multiple to the numerator or intermediate result.

(11) Left shift the numerator or intermediate result one digit position.

(12) Proceed with the next iteration, starting at step (3).

A hexadecimal example of this method follows.

| Numerator is 0.36B90C | | Denominator is 0.12EE14 |
|---|---|---|
| Multiple Digit | Table of Multiples | Associative Array |
| X1 | 0012EE14 | 01 |
| X2 | 0025DC28 | 02 |
| X3 | 0038CA3C | 03 |
| X4 | 004BB850 | 04 |
| X5 | 005EA664 | 05 |
| X6 | 00719478 | 07 |
| X7 | 0084828C | 08 |
| X8 | 009770A0 | 09 |

The underscored byte in the table is the one which is loaded into the associative array. In the following example the byte over which the bar appears is the most significant byte which is used for comparison in the associative array. The sequence of operations for this example follows.

```
         0036B90C
      -X3 0038CA3C        Match on the X3 entry
         FFFDEEDO
   2 |+X1 0012EE14        Underflow 010DCE40         X8 flag is up - make 2 passes
      -X8 009770A0        if no underflow
         00765DA0         X6 flag this pass
   E |-X6 00719478

004C9280
   4 |-X4 004BB850        X4 with no adjustment

000DA300
   0 |-X0 00000000        Smaller than X1

00DA3000
      -X8 009770A0        X8 flag is up - make 2 passes
         0042BF60         if no underflow
      -X4 004BBB50
         FFF70710         X4 is closet on second pass
   B |+X1 0012EE14
                          Overshot, adjust result 009F5240
    |-X8 009770A0         X8 flag again 0007E1A0
   8 |-X0 00000000        Second pass result .lt. X1
         007E1A00         Remainder
```

The final answer is 2E40B8. Microcoding may be utilized to calculate the position of the hexadecimal point to give 2.E40B8.

FIG. 3 is a block diagram of division apparatus in accordance with a preferred embodiment of the invention. The individual elements of the arrangement shown in FIG. 3 are well known in the art and hence only a description of the combination will be made.

The apparatus shown in FIG. 3 operates in two completely different modes, based on the binary state of control line 13. When this signal assumes the logically active state, the apparatus operates in an 'initialization' mode. When the control signal is in the inactive state, the configuration operates in the 'division loop' mode. The embodiment will be described in the context of each mode.

During 'initialization' mode, address bus 15 supplies the table of multiples 11 and the associative memory 21 with signals appropriate for storing data into successive locations. This may be accomplished with a simple incrementation device (a counter—not shown). Address selection for the table of multiples 11 is under the control of the previously described line 13 which causes the propagation of address bus 15 through the multiplexer 17. Inverter 19 in conjunction with control line 13 inhibits interference from address bus 23. The aforementioned data are generated in the ALU 3 (which must be capable of addition and subtraction in the chosen radix). The ALU receives input data directly from register 7 (the left-shift device 5 is deselected in this mode—data are passed unmodified), and indirectly from the table of multiples 11 through register 29. Data generated in the ALU are routed to the data inputs of associative memory 21 via data bus 25, and to the table of multiples 11 via data bus 25 and destination register 9. Iterative operation serves to construct the multiples table and the most significant byte shadow table. This completes the description of the action of the embodiment in 'initialization' mode.

In 'division loop' mode, it is assumed that the device will have been initialized as described above. The numerator (at the beginning of the division loop) or the intermediate result (during the division loop) is contained in register 7. In this mode, left shift device 5 is active (ALU 3 receives data from register 7 after having shifted left by one digit position—4 bits in the case of hexadecimal). The ALU 3 performs subtraction using as operands this shifted value from register 7 and a value selected from the table of multiples 11. Register 29, referred to as the source register, serves as a temporary holding place for this selected value. The result of this subtraction provides several vital pieces of information. The first outcome is a new value for the intermediate result which is routed back to register 7 by way of data bus 25 and destination register 9.

Secondly, a comparison byte (described previously) is selected from the new intermediate result, and is loaded into register 27, also via data bus 25. Register 27 feeds the inputs of associative memory 21 wherein a parallel comparison is made between the register 27 contents and the previously loaded shadow table values. This comparison within memory 21 is reduced to an encoding which represents the address of the entry in the table of multiples 11 which will be used in the next subtraction iteration. The value of this encoding is routed to the table of multiples 11 via address bus 23 and multiplexer 17. Recall that during the division loop, control line 13 is in the inactive state. This disables any effect of address bus 15; yet, via inverter 19, allows the propagation of address bus 23 through multiplexer 17.

The third effect of the ALU operation is the creation of status information that will determine the sequencing of the device as shown in FIG. 2. This sequencing involves the development of a control signal 41 which indicates, when active, that a second pass is required. It is determined by the coincidence of the conditions 'X8 FLAG=1' (provided by control line 39) and the inversion of the 'UNDERFLOW' signal 31. Boolean logic 35 and 37 implements this computation. The X8 FLAG is concurrently stored during a first-pass operation in latch 43. It is this latch which will be merged with the remainder of the computed digit at assembler 45. The algorithm provides not only for optional second-pass sequencing for digits greater than 8, but also for the adjustment of the intermediate result in the event of an underflow; thus the visibility of 'UNDERFLOW' 33. Adjustment also requires modification of the output digit before it is made available at bus 53. This is done by control logic 49, multiplexer 47, and control line 31 ('UNDERFLOW'). Decrementer 55 subtracts 1 from the potential output digit; the selection of the correct digit is signaled by control output 51; when it is in the active state, data bus 53 is known to contain a valid output digit.

Correct operation is obtained by iterating through the numerator or intermediate result, observing the sequencing status signals 33 and 41, and storing output digits from 53 as they are made available (as indicated by line 51).

It will be noted that much of the apparatus shown in FIG. 3 and described above can be utilized for other operations. For example, the arithmetic and logic unit can be used for other arithmetic operations such as addition and subtraction or various logical operations depending on the controls, which are not shown in order to clarify the drawings. The various registers also may be utilized in other types of data processing operation.

It will be apparent from the foregoing that the present invention contemplates a novel and efficient method of providing division for hexadecimal or decimal numbers, and provides a unique combination of apparatus for carrying out the method as illustrated in Fig. 3, which arrangement does not require anything but conventional circuit components, arranged in the novel combination shown and described.

While we have illustrated and described the preferred embodiments of my invention, it is to be understood that we do not limit ourselves to the precise constructions herein disclosed and the right is reserved to all changes and modifications coming within the scope of the invention as defined in the appended claims.

We claim:

1. The method of performing division using a digital processor wherein a quotient digit value is obtained by finding the largest multiple of the denominator value that is less than or equal to the numerator or intermediate result, comprising the steps of:
   A. generating a table of multiples by multiplying the denominator value by successive integer multipliers starting with unity;
   B. storing the multiples;
   C. storing the most significant byte of each of the multiples;
   D. using comparing means to sequentially compare the most significant byte of the numerator or intermediate result with each most significant byte in storage to find the selected entries where the most significant byte is less than or equal to the most significant byte of the numerator or intermediate result;
   E. detecting the multiplier corresponding to the largest most significant byte satisfying the comparison;
   F. selectively addressing said table of multiples for the corresponding multiple in accordance with the detected multiple;
   G. using subtracting means to subtract the selected multiple from the numerator or intermediate result;
   H. detecting if an underflow condition results from said subtraction, then:
      1. using adding means to add the first entry from the table of multiples to the numerator or intermediate result;
      2. storing the result of said subtraction;
      3. decrementing by 1 the value of the detected multiplier;
      4. and storing the value of the decremented, detected multiplier as the intermediate quotient value;
   I. detecting if no underflow condition results from said subtraction and if the detected multiplier does not correspond to the last entry in the table of multiples, then:
      1. storing the result of said subtraction;
      2. and storing the value of the detected multiplier as the intermediate quotient value;
   J. detecting if no underflow condition results from said subtraction and if the detected multiplier corresponds to the last entry in the table of multiples, then:
      1. setting a pass indicator equal to the detected multiplier;
      2. performing a second pass by repeating steps D through I using the result of said subtraction as the intermediate result;
      3. using summing means to sum the pass indicator to the detected multiplier resulting from the second pass;
      4. storing the sum as the intermediate quotient;
   K. and, left-shifting the numerator or intermediate result.

2. The method as claimed in claim 1 wherein the base or index is hexadecimal.

3. The method as claimed in claim 1 wherein the base or index is binary coded decimal.

4. The method as claimed in claim 1 wherein the steps D through K are repeated until all quotient digits have been determined.

5. Apparatus for performing division wherein a digit value multiplied by a denominator value is less than or equal to a numerator or intermediate result, comprising:
   generating means for generating a table of multiples by multiplying the denominator value by successive integer multipliers starting with unity;
   means for storing the multiples generated by said generating means;
   an associative memory array;
   means, connected to said generating means, for storing the most significant byte of the multiples in the associative array;
   means, connected to said associative array, for sequentially comparing the most significant byte of the numerator or intermediate result with each entry in the associative array to find a selected entry which is less than or equal to the most significant byte of the numerator or intermediate result;
   means, connected to said comparing means, for detecting the multiplier corresponding to the largest most significant byte satisfying the comparison;
   means responsive to said detected multiplier for selectively addressing said table of multiples for the corresponding multiple;
   subtracting means for subtracting the selected multiple from the numerator or intermediate result;

means for storing the result of said subtraction;

first means, connected to said subtracting means, for detecting underflow;

second means, responsive to said detected multiplier, for determining if said detected multiplier corresponds to the largest multiple in the table of multiples;

means, responsive to said first and second means, for storing the detected multiplier as an intermediate quotient if said first means detects no underflow and if said second means detects no correspondence;

means, responsive to said first means, for decrementing said detected multiplier and for storing said decremented detected multiplier as an intermediate quotient if said first means detects underflow;

means, responsive to said first and second means, for storing said multiplier and for forcing a second pass if said first means detects no underflow and if said second means detects correspondence; and means, for summing said stored multiplier with the multiplier resulting from the second pass, and for storing the sum as an intermediate quotient.

6. Apparatus as claimed in claim 5 wherein the means for storing said multiples is a read/write storage array.

7. Apparatus as claimed in claim 6 wherein the read/write array and the associative array are loaded simultaneously.

8. Apparatus as claimed in claim 6 wherein the most significant byte of the numerator or intermediate result is stored in a register connected to the associative array for comparison with the entries of the associative array.

9. Apparatus for performing hexadecimal division wherein a digit value multiplied by a denominator value is less than or equal to a numerator or intermediate result, comprising:

generating means for generating a table of the first eight multiples for the denominator value;

means, connected to said generating means, for storing the multiples generated by said generating means;

an associative memory array;

means, connected to said generating means, for storing the most significant byte of the multiples in the associative array;

means, connected to said associative array, for sequentially comparing the most significant byte of the numerator with each entry in the associative array to find a selected entry which is less than or equal to the most significant byte of the numerator;

means, connected to said comparing means, for detecting the multiplier corresponding to the largest most significant byte satisfying the comparison;

means responsive to said detected multiplier for selectively addressing said table of multiples for the corresponding multiple;

subtracting means for subtracting the selected multiple from the numerator or intermediate result;

means for storing the result of said subtraction;

first means, connected to said subtracting means, for detecting underflow;

second means, responsive to said detected multiplier, for determining if said detected multiplier equals eight;

means, responsive to said first and second means, for storing the detected multiplier as an intermediate quotient if said first means detects underflow and if said second means detects inequality;

means, responsive to said first means, for decrementing said detected multiplier and for storing said decremented multiplier as an intermediate quotient if said first means detects underflow;

means, responsive to said first and second means, for storing said multiplier, and for forcing a second pass if said first means detects no underflow and if said second means detects equality; and means, for summing said stored multiplier with the multiplier resulting from the second pass, and for storing the sum as an intermediate quotient.

* * * * *

UNITED STATES PATENT AND TRADEMARK OFFICE
CERTIFICATE OF CORRECTION

PATENT NO. : 4,466,077

DATED : August 14, 1984

INVENTOR(S) : R. A. Innaucci et al

It is certified that error appears in the above-identified patent and that said Letters Patent is hereby corrected as shown below:

Col. 6, line 8   Delete "subtraction" and substitute therefor --addition--.

Col. 7, line 20  After "said" add --detected--.
      line 23   After "stored" add --detected--.

Col. 8, line 29  After "detects" add --no--.
      line 36   After "said" add --detected--.
      line 39   After "stored" add --detected--.

Signed and Sealed this

Thirtieth Day of April 1985

[SEAL]

Attest:

DONALD J. QUIGG

Attesting Officer     Acting Commissioner of Patents and Trademarks